United States Patent [19]

Gorog et al.

[11] 4,206,477

[45] Jun. 3, 1980

[54] OPTICAL RECORDING WITH TRACK DROP COMPENSATION

[75] Inventors: Istvan Gorog, Princeton; Arthur H. Firester, Skillman, both of N.J.

[73] Assignee: RCA Corporation, New York, N.Y.

[21] Appl. No.: 938,234

[22] Filed: Aug. 30, 1978

[51] Int. Cl.² .......................... G11B 7/00; H03F 1/28
[52] U.S. Cl. ........................... 358/128.5; 179/100.3 N
[58] Field of Search ............... 358/128; 179/100.3 V, 179/100.3 GN, 100.3 P, 100.3 N, 100.4 C

[56] References Cited

U.S. PATENT DOCUMENTS

| | | | |
|---|---|---|---|
| 4,093,961 | 6/1978 | Kanamura | 179/100.3 N |
| 4,114,180 | 9/1978 | Kayanumz | 179/100.3 N |
| 4,123,780 | 10/1978 | Honjo | 179/100.3 P |

Primary Examiner—Vincent P. Canney
Attorney, Agent, or Firm—Eugene M. Whitacre; Joseph S. Tripoli; Jerald E. Roehling

[57] ABSTRACT

The beam intensity of an optical recording system employed for recording frequency modulated composite video signals on discs undergoes temporal distortion at critical signal frequencies in a manner complementary to the effects of frequency distortion in the spatial frequency response of the recording system. Concomitant recording of the composite signal and a groove effects a practical elimination of signal track drop which results when recording is effected on pre-grooves discs, and additionally eliminates frequency response distortions in the recorded signal due to the optical recording system.

12 Claims, 5 Drawing Figures

OPTICAL RECORDING WITH TRACK DROP COMPENSATION

This invention relates generally to novel light beam recording apparatus for use in the recording of video and audio signal information on disc records and more particularly to novel recording apparatus employing recording beam intensity distortion in one aspect and simultaneous video signal and groove recording in order to reduce non-uniformities in the groove and signal depth of the recorded disc in another aspect.

In U.S. Pat. No. 3,842,194, issued on Oct. 15, 1974 to Jon K. Clemens, video disc playback systems of a variable capacitance form are disclosed. In an arrangement therein described, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turtable; the capacitance variations are sensed to recover the recorded information.

In one format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In a technique for recording the information on a pre-grooved video disc master, an electron beam subject to intensity modulation in accordance with FM carrier signals impinges upon electron beam sensitive material in the master disc groove bottom, so that subsequent development leaves the desired releif pattern in the groove bottom. Reference may be made to U.S. Pat. No. 3,943,302 of Loren B. Johnston, Ser. No. 335, 024, filed Feb. 23, 1973, and entitled "Electron Beam Recording in Thick Materials," for a description of recording techniques that may be employed in such relief pattern development.

In one optical recording technique for recording composite color video signals with accompanying audio signals on a pre-grooved video disc master, the accompanying audio signals are caused to frequency modulate a low frequency sound carrier over a low frequency deviation range (illustratively, approximately 716 KHz±50 KHz). The output of the sound carrier modulator is added to the output of a picture carrier modulator. In the picture carrier modulator, a composite color video signal (including luminance signals occupying a givein band of frequencies, and chrominance signals appearing as side band components of a modulated chrominance subcarrier interleaved with luminance signal components in an intermediate region of the given band) is caused to frequency modulate a high frequency picture carrier over a high frequency deviation range (illustratively, approximately 4.3–6.3 MHz). The peak-to-peak amplitude of the sound modulator output is held at a level which is small relative to the peak-to-peak amplitude level of the picture modulator output, with an illustrative level ratio being 1:7. The signal resulting from the combination of the respective modulated carriers is applied to a limiter circuit to develop an output signal which may be conveniently described by a pulse train having a repetition rate corresponding to the frequency of the frequency modulated picture carrier, and having a "duty cycle" which varies cyclically about a 0.5 value, with the frequency of said cyclic variation of "duty cycle" corresponding to the frequency of the frequency modulated sound carrier. The duty cycle modulated output, illustratively, is used to intensity modulate a scanning laser beam. As successive groove bottom regions of a grooved disc master, coated with a layer of light sensitive material (forming a smoothly curved surface for the groove), pass through the laser beam path, the regions are exposed in a pattern determined by the intensity controlling signal. Upon subsequent development, a relief pattern of geometric variations corresponding to the exposure pattern is established in the groove bottom of the disc master.

A stamper disc may be derived from the recording master, by techniques described in the Clemens patent, and utilized, through conventional record stamping machinery, to produce a plurality of replica discs of thermoplastic material. Each replica disc has a surface groove with a relief pattern of geometric variations, corresponding to the pattern of the video disc master, in the bottom thereof.

The limits of an optical recording system are defined by the ability of the recording lens to form the laser beam into a tightly focused spot. For a uniformly illuminated diffraction limited lens the focused spot width, W, between half-intensity points can be represented by $$W = \lambda/2NA \tag{1}$$

where $\lambda$ is the wavelength of the light and NA is the lens numerical aperture. In practice because high numerical aperture lenses are not perfect, the focused spot width is substantially larger than that predicted by equation 1. The finite size of the focused spot in an optical recorder for video disc effects the response of the system (i.e., the response tends to roll off at high spatial frequencies, the spatial frequency being a function of the temporal frequency of the recording signal, the frequency of rotation of the disc and the radial position of the recording beam on the master disc.)

In an ideal optical recording system using a pre-grooved master disc where the recording beam is turned on and off in response to the input signal, the information track geometry would consist of an undisturbed groove bottom interleaved with depressed regions or "pits" of substantially uniform depth. However, in an optical recorder where the recording beam width is not negligible compared with the signal wavelength, the pits tend to become shallower at high spatial frequencies due to the non-uniform frequency dependent response. The effect of this non-uniform response is to introduce "signal track drop" into the record master.

In playback of a video disc with a stylus as disclosed in the Clemens patent, the signal track drop results in a variation in the spacing between the stylus electrode bottom and the groove bottom. The dielectric support portion of the stylus is desirably of considerably greater length (along the groove) than the conductive electrode portion and the stylus structure will ride on the upper surface of the groove. As a consequence, when varying signal track drop is encountered, undesirable variations in the spacing between the stylus electrode bottom and the groove bottom will result.

One of the consequences of the aforementioned spacing variations due to varying track drop is that the signals recovered by sensing of the changes of the capacitance between the stylus electrode and the disc's conductive layer are subject to undesired amplitude and phase modulation. However, the amplitude modulation effects are tolerable to a considerable degree. Amplitude interference in the video signal can be effectively removed by limiter circuitry preceding the FM demodulator in playback apparatus.

A more troublesome consequence is the phase modulation of the recovered picture carrier signals caused by the signal track drop variations. Phase modulation is not subject to removal by the playback limiter circuitry. Thus, spurious phase modulation, caused by the signal track drop variations, may effect in the player's FM demodulator an output signal including an interfering component.

These track drop variations can be reduced by providing a disc groove which is interleaved with pits of substantially uniform depth (hereinafter to be referred to as constant track drop). This constant track drop is achieved by distorting the low modulation frequency to balance the effect of the high frequency modulation roll-off.

In practice, however, it has been found that it is difficult to control or compensate over a wide frequency range for the non-uniform response with predistortion of the input signal to obtain constant track drop. In addition, while such a constant track drop is effective in reducing the undesired phase modulation interference, its presence may effect, during playback of a replica produced from such a master, improper stylus seating on the groove bottom. Such improper seating may effect a deterioration of the unrecovered signal and an acceleration of stylus wear. In accordance with one aspect of the present invention, improper stylus seating is eliminated.

In further accordance with the principles of the present invention, track drop is eliminated in the optical recorder by simultaneously recording a groove and signal with a predistortion to compensate for the non-uniform frequency dependent response of the optical recorder due to the aforementioned constraints on the recorder compensation. The essential difference between the input signal predistortion necessary to compensate for the spatial frequency response of an optical recorder and the input pre-distortion necessary to compensate in an electronic system is that in the latter case the electronic compensator can predistort the signal with no constraints on the output signal, whereas in the case of an optical recorder and modulated optical beam can only vary between no light and maximum light (i.e., the optical output must be positive).

In this embodiment the recording beam is not turned on and off but may advantageously be intensity modulated in accordance with the predistorted input signal. Under these circumstances, when it is desirable to eliminate track drop by recording groove and signal simultaneously, it is particularly attractive to record the linear sum of the FM modulated video carrier and the FM modulated audio carrier without subsequent amplitude limiting. In this manner no spurious intermodulation products caused by the clipping are recorded. Furthermore, by introducing a non-linear, i.e., intensity dependent, distortion it is possible to compensate for non-linear effects in the exposure-development characteristics of the recording medium.

Since the compensation required on the input signal varies with the radial position of the recording beam on the disc surface, in further accordance with the principles of the present invention, the distortion is varied as a function of the radial position of the recording beam.

In accordance with yet another principle of the present invention, the intensity of the recording beam is attenuated to provide a constant groove depth across the surface of the disc.

In further accordance with the principles of the present invention, the recording process is simplified. By recording the groove on the optical recorder, the groove machining step is eliminated. But more importantly, the signal recording beam no longer has to track a pre-formed groove, thus eliminating the need for groove tracking and alignment apparatus. Additionally, in accordance with a principle of the present invention, the standing waves at the surface of the recording blank (effects due to substrate reflection) may be eliminated by using a sufficiently thick coating of light absorbing photosensitive resist.

Figure 1:
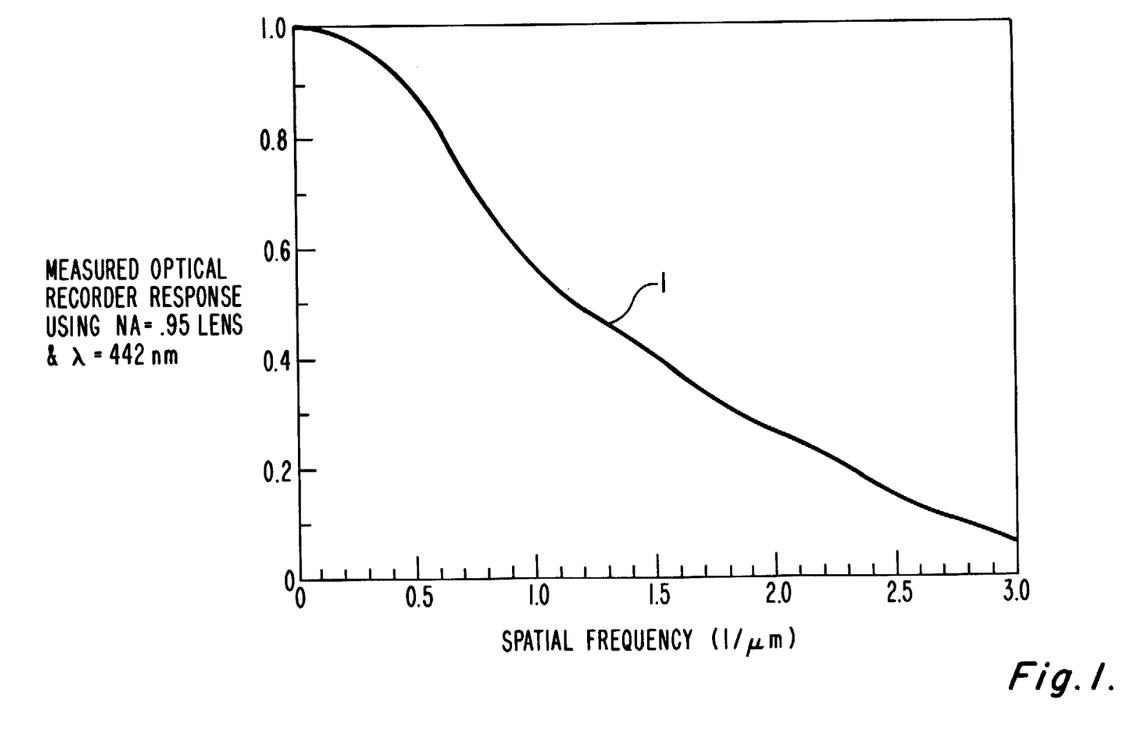
FIG. 1 shows a graph of the measured response of an optical recorder having a recording lens with a $NA=0.95$ and $\lambda=442$ nm.

Curve 1 of FIG. 1 illustrates the response of an optical recorder having a finite focused spot. The ordinate of the graph of FIG. 1 defines the response of the system normalized to 1.00 and the abscissa defines the spatial frequency in units of 1/microns.

Figure 2:
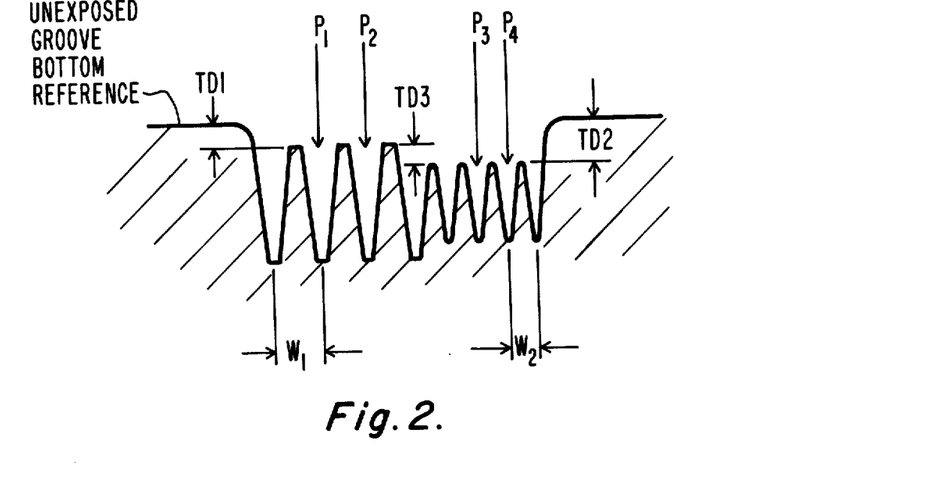
FIG. 2 is a cross-sectional view of a portion of an information track illustrating track drop.

The information track shown in FIG. 2 serves to illustrate some of the aforementioned difficulties encountered in recording a master disc. A recording system where a constant amplitude recording signal is employed produces pit regions of relatively shallow depth (illustratively, $P_3$, $P_4$ in FIG. 2) at a high spatial frequency, such as $1/W_2$ in FIG. 2. The spatial frequency $1/W$ is a function of the instantaneous modulation frequency (f) of a high frequency FM modulator, the disc rotation rate, and the radial position of the recording beam on the surface of the disc record. However, at lower spatial frequencies, such as $1/W_1$ in FIG. 2, pit regions of deeper depth are produced (illustratively, $P_1$, $P_2$ in FIG. 2). Since the average light beam intensity is assumed to be constant and the response of the optical recorder is higher at frequency $1/W_1$ than at $1/W_2$, a reduction TD3 in the height of the intervening groove bottom areas at the aforesaid $1/W_2$ frequency relative to the height at the aforesaid $1/W_1$ frequency is effected. This height reduction TD3, which is defined as relative signal track drop is a function of the spatial frequency and therefore a function of the modulation frequency and the radial position of the recording beam along the surface of a disc record (assuming the disc rotation rate to be constant).

In an optical recording system where the resist coated recording master is exposed simultaneously with the video signal information and the groove, the input video signal can be predistorted to compensate for the non-uniform response of the recorder within a limited spatial frequency range. The spatial frequency band over which compensation can be effected as illustrated with reference to FIG. 1. For an optical recorder having the characteristics described in FIG. 1, predistortion of the information signals can be effected for spatial frequencies from 0, where the measured recorder response is equal to 1.0, to the spatial frequency which corresponds to a recorder response equal to the ratio of half the peak-to-peak amplitude of the desired signal undulations to the desired average groove depth, illustratively, for a half peak-to-peak signal undulation of 40 nm and an average groove depth of 320 nm, the ratio of ⅛ would limit the compensable region to spatial frequencies less than 2.5 $\mu m^{-1}$ for the recorder response depicted in FIG. 1.

Figure 3:
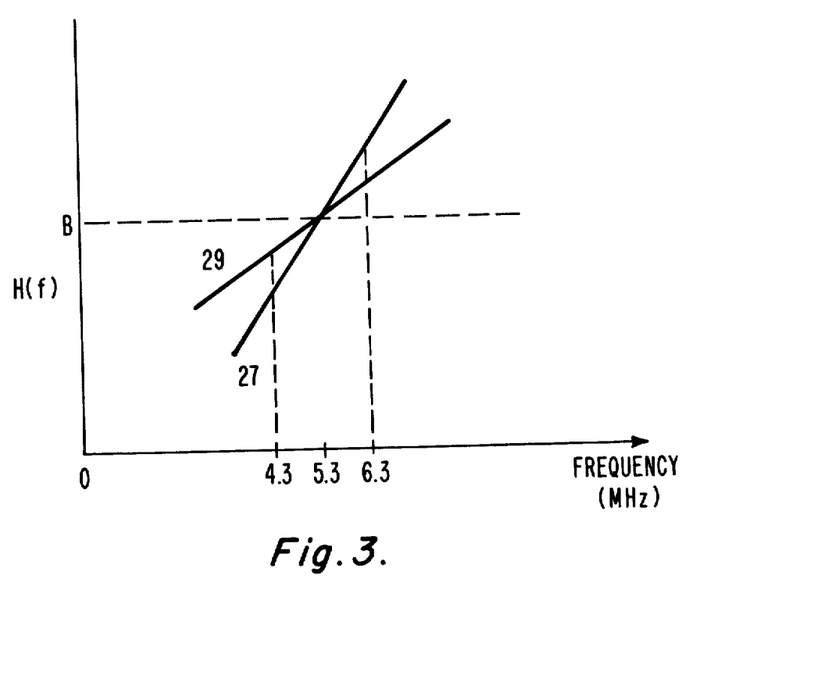
FIG. 3 shows graphs of the predistortion of the input signal of an optical recording system as a function of temporal frequency.

The substantially predictable or measurable behavior of the response as shown in FIG. 1 enables compensation for the frequency dependent variations. A predistortion which effects production of a replica disc which on playback shows substantially no phase modulation distortion of the recovered picture carrier signals is illustrated by the graphs of FIG. 3. The abscissa of the graph defines the modulation frequency f and particularly the frequencies of interest, i.e., 4.3–6.3 MHz. The ordinate, illustratively H(f), defines the relative distortion. Curves 27 and 29 delineate the limits of a family of curves which are dependent upon the radial position of the recording beam along the surface of the disc record. Specifically, curve 27 delineates the relative distortion H(f) as a function of temporal frequency which is necessary to produce the information signal and groove having substantially uniform depth when the recording beam is at the inner radius position of the disc record while curve 29 delineates the corresponding distortion at the outer radius position on the disc record. The family of curves described with reference to FIG. 3 can be substantially represented by:

$$B(1 - A\cos\frac{\pi}{2}\frac{f}{f_o}) \quad (2)$$

where B and A are variable quantities which are chosen as a function of the radial position of the recording beam on the surface of the disc record, where f represents the modulation frequency (illustratively 4.3–6.3 MHz) and where $f_o$ represents a given constant frequency (illustratively 5.3 MHz) within the modulation frequency band of interest.

Since the light source, in an optical recording system where the resist coated recording master is exposed simultaneously with the video signal information and the groove, is biased on at some intensity, the exposure of the track (i.e., the signal and groove) varies on the average from the outer radius of the disc to the inner radius. This variation in exposure causes a variation in the depth of the track upon subsequent development of the disc. To compensate for this depth variation the average light beam intensity is varied across the surface of the disc by intensity attenuating the beam as the beam travels from an outer convolution on the disc to an inner convolution.

It will be appreciated that simultaneous groove and signal recording is advantageously accomplished on a conventional recording blank having a thick resist layer (i.e., typically greater than 3 microns of Shipley 1350B photoresist when used with light of wavelength 442 nm) or a non-reflective substrate, either of which serves to reduce standing waves within the photoresist, which otherwise complicate the aforementioned compensation for track drop.

Reference may be had to a copending application of L. Lin, Ser. No. 862,192, filed Dec. 19, 1977, for a description of a method and apparatus for achieving control over the depth of development of a resist coating. Use of the Lin apparatus enables the achievement of an adequate resist development for the production of recording masters in accordance with the principles of the present invention.

Figure 4:
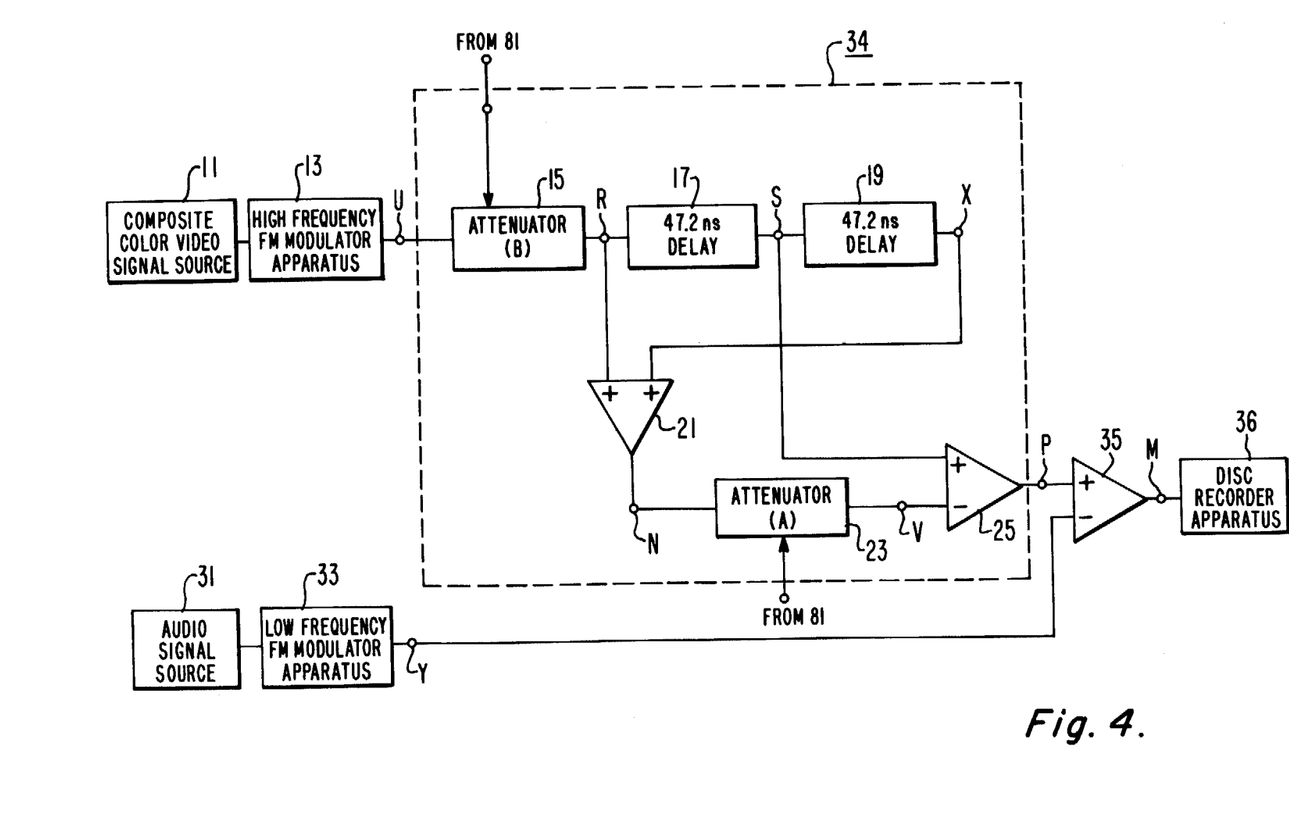
FIG. 4 provides a representation, partially in block diagram form, of an optical recording apparatus including distortion compensation circuitry suitable for use in formation of an information record pursuant to the principles of the present invention.

In the optical recording system of FIG. 4, a composite color video signal source 11 supplies a composite signal, inclusive of luminance information and encoded chrominance information representative of a succession of scannings of colored images to be recorded, to a high frequency FM modulator apparatus 13. The modulator apparatus 13, incorporating a suitable source of high frequency oscillations, functions to develop at its output terminal U, a frequency modulated picture carrier signal. The instantaneous frequency (f) thereof varying over a predetermined high frequency deviation range (e.g., 4.3–6.3 MHz) in accordance with the signal supplied by source 11.

The output of modulator apparatus 13 is coupled, through an attenuator (B) 15, to first and second, serially connected delay lines 17 and 19. Delay lines 17 and 19 respectively effect a time delay (T) which is one quarter of the period of an oscillation at the central frequency ($f_o$) of the output of modulator apparatus 13 (illustratively, in this embodiment where $f_o = 5.3$ MHz, $T = 47.2$ ns). The output signals of attenuator 15 and delay line 19 are additively combined in amplifier 21. The output of amplifier 21 is, in turn, applied through an attenuator (A)23, to one input of an amplifier 25 wherein it is subtractively combined with the output of the first delay line 17.

It will be appreciated that elements 15 through 25 enclosed in block 34 comprise a compensation network which effects distortion of the amplitude of the output of modulator apparatus 13 in a manner which can be made complementary to the response of the optical recording system.

The signal output from the modulator apparatus 13 may be represented by the expression $Ke^{i\omega t}$ where K is the modulated signal level and $\omega$ is the angular frequency of the signal. The output from the attenuator 15 at terminal R can be represented by $BKe^{i\omega t}$ where B is the gain of the attenuator. The signals at terminals S and X out of the delay lines 17 and 19 will be $BKe^{i\omega(t+T)}$ and $BKe^{i\omega(t+2T)}$ respectively where T is the time delay of each of the delay lines. Since the output of amplifier 21 is the sum of the signals at terminals R and X, the signal at terminal N can be represented by $B[2\cos\omega T]Ke^{i\omega(t+T)}$ where $Ke^{i\omega(t+T)}$ is the original signal shifted in phase by the time delay T. Thus, the output of attenuator 23 can be represented by $AB[2\cos\omega T]Ke^{i\omega(t+T)}$ where A represents the gain of attenuator 23. Subtractively combining the output of attenuator 23 at terminal V with the output of first delay line 17 at terminal S in amplifier 25 provides a signal at terminal P which may be substantially represented by $B[1 - 2A\cos\omega T]Ke^{i\omega(t+T)}$. Where T equals a time delay of one quarter of the central frequency $f_o$ of the modulated frequency deviation and $\omega$ equals $2\pi f$ where f is substantially the instantaneous modulation frequency, the signal at point P can be rewritten as $$B[1 - 2A\cos\frac{\pi}{2} \frac{f}{f_o}] Ke^{i\omega(t+T)}. \quad (3)$$

The above analysis demonstrates that the distortion network 34 effectively provides a distortion of the original signal necessary to compensate for the non-uniform frequency dependent response of the recorder by compensating for the recorder response at frequency $f_o$ using attenuator 15 and compensating for the slope of the recorder response in the vicinity of $f_o$ using attenuator 23.

As stated above, this response varies as a function of the radial position of the recording beam on the surface of the disc.

The recording system of FIG. 4 further includes an audio signal source 31, which supplies an audio signal representative of a desired sound accompaniment for the color images being recorded, to a low frequency FM modulator apparatus 33. The modulator apparatus 33, incorporating a suitable source of low frequency oscillations, functions to develop at its output terminal Y a frequency modulated sound carrier signal, the instantaneous frequency thereof varying over a predetermined low frequency deviation range (illustratively 716 KHz±50 KHz) in accordance with the amplitude of the audio signal supplied by source 31.

The video modulator apparatus 13 maintains the peak-to-peak amplitude of the picture carrier signal, developed at output terminal U, substantially constant at a given level. The modulator apparatus 33 also maintains the peak-to-peak amplitude of the sound carrier signal, developed at output terminal Y, substantially constant, but at a level which is small relative to the picture carrier level (an illustrative level ratio is 7:1).

The respective carrier signals appearing at terminals P and Y are supplied to an amplifier 35, which combines the two carrier signals. The resultant signal, appearing at the amplifier 35 output terminal M, comprises a linear combination of the respective signal input components and is supplied as a linear recording signal input to a suitable optical disc recording apparatus 36, illustratively of a type to be hereinafter described in more detail.

Figure 5:
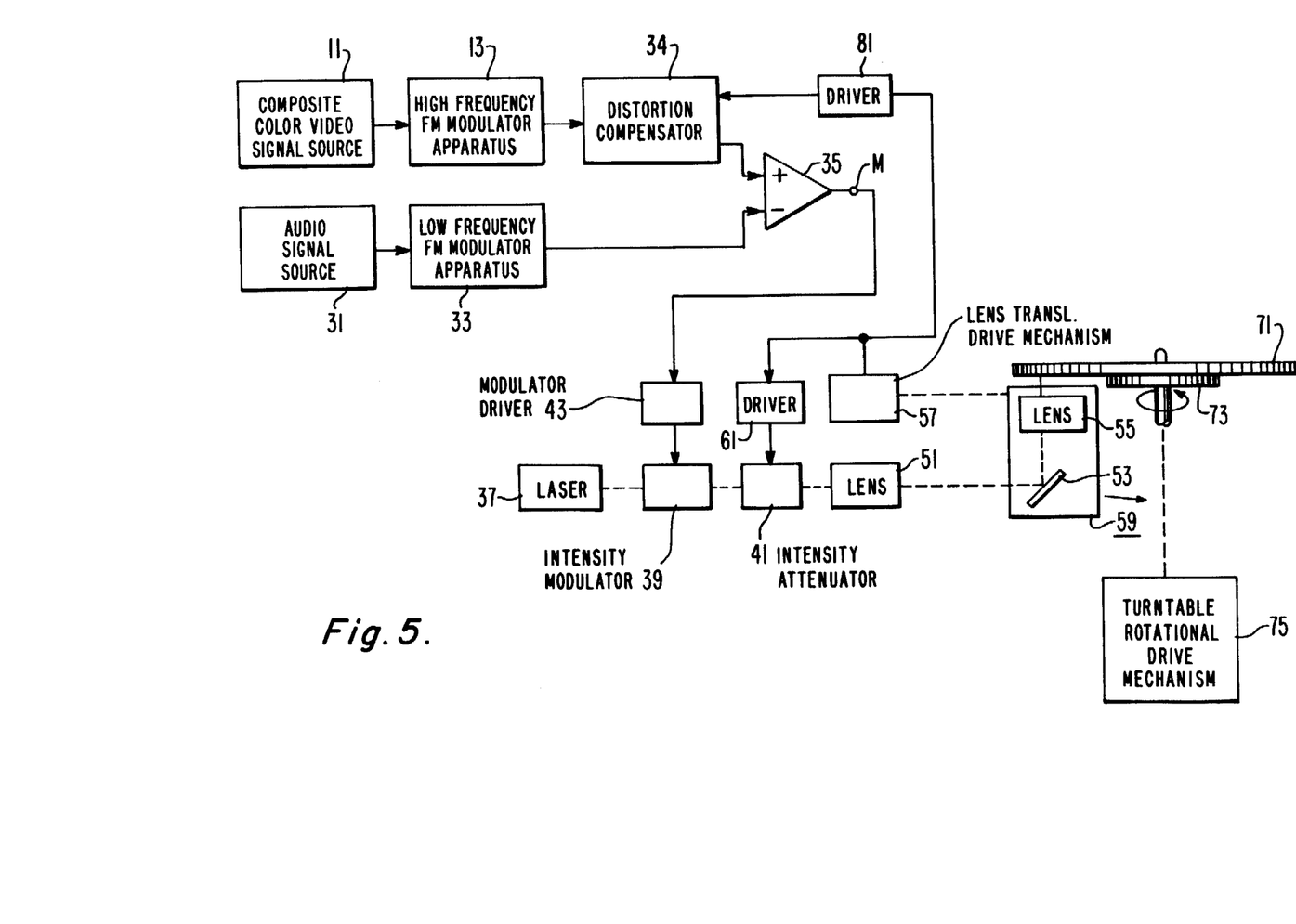
FIG. 5 provides a representation, partially in block diagram form, of an embodiment of an optical recording apparatus suitable for use in formation of an information record pursuant to principles of the present invention.

FIG. 5 illustrates a preferred embodiment of recording apparatus useful for the purposes of the present invention. For an initial explanation of operation of the illustrated apparatus, it should be assumed that a disc master 71, supported on a turntable 73, is a record blank comprising a flat copper-coated aluminum disc with a thick resist layer (e.g., Shipley 1350B resist with a thickness greater than three microns at a recording wavelength of 442 nm.) of light sensitive material overlying the copper coating. Turntable 73 is subject to rotation at a constant rate (e.g., 450 rpm) by the turntable rotational drive mechanism 75.

The monochromatic light output of a laser 37 (illustratively of a He Cd type providing an output wavelength of 442 nm) is passed via an intensity modulator 39 to an intensity attenuator 41. The intensity modulator 39 is driven by a modulator driver 43 coupled to point M of the output of an amplifier 35. Amplifier 35 provides a linear combination of signal input components to the modulation driver 43. Blocks 11, 13, 31, 33, 34 correspond to the same blocks described in connection with FIG. 4. The light intensity of the laser beam at the output of modulator 39 is thereby modulated in accordance with signal input components supplied to the modulation driver 43. These signal input components represent, as explained with reference to FIG. 4, a linear combination of a distortion compensated high frequency modulated composite color video signal and a low frequency modulated audio signal which, depending on the optical recorder response may also be predistorted. While the operation of the attenuator 41 will be subsequently discussed, it may be assumed for purposes of the present discussion that no attenuation is presently effected.

Lens system 51 forms the light passed by attenuator 41 into a beam which is reflected by a mirror 53 onto the entrance aperture of a lens 55. The lens 55 focuses the intensity modulated light beam reflected by mirror 53 onto the light sensitive surface layer of the disc 71. The exposure of the light sensitive material is related to the intensity of the impinging light beam. A light sensitive layer region in the path of the focused light beam when the light beam intensity level is high undergoes high exposure, while a light sensitive layer region in the path of the focused light beam when the light beam intensity level is low undergoes little exposure. Upon subsequent development of the resist layer, those regions exposed to the light beam are removed to form an information track comprising a groove and signal information.

A lens translational drive mechanism 57 provides a constant rate radial motion of an assembly 59 (incorporating lens 55 and mirror 53), when a spiral track formation is desired.

Since the exposure of the resist layer tends to increase when the light source (e.g., laser 37) is biased on at some constant intensity, as the light beam travels from the outermost convolution of the disc's spiral groove toward the innermost convolution, the intensity attenuator 41, in FIG. 5, effects an adjustment of the recording light beam in a manner which provides a substantially constant average light beam exposure at the record surface. The gain of said attenuator may be made adjustable in response to the radial position of the light beam on the disc surface so that the intensity of the light beam at the surface of the disc may be adjusted.

The attenuator 41 may advantageously be rendered responsive to an intensity attenuator driver 61 which in turn is responsive to the radial position of the light beam on the record surface as indicated by an output signal of the lens translational drive mechanism 57 (FIG. 4).

Since the distortion necessary to compensate for signal track drop is a function of the radial position of the light beam on the record surface, the distortion compensator 34 of FIG. 5 can be advantageously rendered responsive to the radial position of the light beam. This may be accomplished by a driver 81, coupled to the distortion compensator 34, responsive to the output of the lens translational drive mechanism 57 of FIG. 5. The driver 81 may be used to adjust the gains of attenuators 15 and 23 of FIG. 4.

What is claimed is:

1. In an optical disc recorder for recording information signals on a record medium, said recorder comprising: a turntable for rotatably supporting said record medium; means for providing a focused beam of light; means for intensity modulating said focused beam in accordance with said information signals; and means for directing said intensity modulated light beam onto the surface of said record medium such that said beam contacts said record medium at a desired location and moves relative to said record medium; the apparatus comprising:

modulation means, coupled to the source of information signals for modulating said signals, said modulation being performed within a given frequency range;

said focused beam of light having a finite spot size affecting the response of said recorder such that said recorder has a variable spacial frequency response within said given frequency range, said variable spacial frequency response affecting the surface relief representation of said modulated signals within said given frequency range on said record medium surface; and means, coupled to said modulation means, for temporally distorting said modulated information signals in a selected portion of said given frequency range to compensate for said variable spacial frequency response and for providing said distorted modulated signals to said intensity modulating means, whereby the surface relief representation formed by the distorted signals recorded on said record medium surface are a substantially accurate representation of said modulated signals within said given frequency range.

2. The apparatus as defined in claim 1 wherein said distortion means comprises:

attenuator means, coupled to said modulation means, for adjusting the modulated signal level in response to the relative position of said beam on said record medium;

a delay means, coupled to said attenuator means, for providing said adjusted modulated signal delayed for a selected time period; and combiner means, coupled to said attenuator means and said delay means, for providing an output signal corresponding to the sum of said adjusted modulated signal and said modulated signal delayed for a selected time period.

3. The apparatus as defined in claim 1, wherein said record medium comprises a disc substrate having at least one substantially flat surface, said surface being coated with a continuous layer of radiant energy sensitive material, said focused light beam being modulated to expose simultaneously a groove and said recorded information signals on said coated surface of said disc; whereby said groove, having said recorded information recorded therein, is used after development of said coated surface to retrieve said recorded information during playback.

4. The apparatus as defined in claim 3 wherein said radiant energy sensitive material has a thickness such that standing waves at the surface of said disc are substantially eliminated.

5. The apparatus as defined in claim 1 wherein said modulation means comprises a frequency modulation means and wherein said modulated signal is represented by $Ke^{j2\pi ft}$ where K is amplitude and where f is the modulation frequency of said modulated signal said modulation frequency being within said given frequency range, and wherein said distorted modulated signal is represented by:

$$B[1 - A\cos\frac{\pi}{2} \frac{f}{f_o}] Ke^{j2\pi ft}$$

where $B[1 - A\cos(\pi/2)(f/f_o)]$ represents the distortion of said modulated signal, where B and A represent gain factors of said distortion means, said gain factors being variable in response to the relative position of said beam on said record medium, and where $f_o$ represents a selected frequency within said given frequency range.

6. In an optical disc recorder for recording information signals on a record medium, said recorder comprising: a turntable for rotatably supporting said record medium; means for providing a focused beam of light; means for intensity modulating said focused beam of light in accordance with said information signals; means for directing said intensity modulated light beam onto the surface of said record medium such that said beam contacts said record medium at a desired location; and means for linearly moving said beam of light relative to said record medium so that said beam traces a substatnially spiral path on a surface of said record medium; the apparatus comprising:

frequency modulation means, coupled to the source of information signals for modulating said signals, said modulation being performed within a given frequency range;

said focused beam of light having a finite size affecting the response of said recorder such that said recorder has a variable spacial frequency response within said given frequency range, said variable spacial frequency response affecting the surface relief representation of said frequency modulated signals within said given frequency range on said record medium surface;

means, coupled to said frequency modulation means, for temporally distorting said frequency modulated information signals in a selected portion of said given frequency range to compensate for said variable spacial frequency response and for providing said distorted frequency modulated signals to said intensity modulating means; and means coupled to said intensity modulating means, for intensity attenuating said intensity modulated beam in response to the radial position of the light beam to provide a substantially constant average exposure; whereby the surface relief representation formed by the distorted signals recorded on said record medium surface are a substantially accurate representation of said frequency modulated signals within said given frequency range.

7. The apparatus as defined in claim 6 wherein said distortion means comprises:

an attenuator means, coupled to said frequency modulation means, for adjusting the frequency modulated signal level in response to the relative position of said beam on said record medium;

a delay means, coupled to said attenuator means, for providing said adjusted frequency modulated signal delayed for a selected time period; and combiner means, coupled to said attenuator means and said delay means, for providing an output signal corresponding to the sum of said adjusted frequency modulated signal and said frequency modulated signal delayed for a selected time period.

8. The apparatus as defined in claim 6, wherein said record medium comprises a disc substrate having at least one substantially flat surface, said surface being coated with a continuous layer of radiant energy sensitive material, said focused light beam being modulated to expose simultaneously a groove and said recorded information signals on said coated surface of said disc;

whereby said groove, having said recorded information recorded therein, is used after development of said coated surface to retrieve said recorded information during playback.

9. The apparatus as defined in claim 8 wherein said radiant energy sensitive material has a thickness such that standing waves at the surface of said disc are substantially eliminated.

10. The apparatus as defined in claim 6 wherein said distortion means comprises:

first attenuator means, coupled to said frequency modulation means, for adjusting the frequency modulated signal level in response to the radial position of said light beam;

first delay means having a time delay T, coupled to said first attenuator means, for providing said adjusted frequency modulated signal delayed for a time interval T;

second delay means having a time delay T, coupled to said first delay means, for providing said adjusted frequency modulated signal delayed for a time interval 2T;

first combiner means, coupled to said first attenuator means and to said second delay means, for providing an output signal corresponding to the sum of said adjusted frequency modulated signal and said frequency modulated signal delayed for a time interval 2T;

second attenuator means, coupled to said first combiner means, for adjusting the signal level of said first combiner output signal in response to the radial position of said light beam; and second combiner means, coupled to said second attenuator means and said first delay means, for providing an output signal corresponding to the combination of said adjusted, first combined signal and said T delayed, adjusted, frequency modulated signals.

11. The apparatus as defined in claim 10 wherein said time delay T of said delay means are substantially equal to $1/4f_o$ where $f_o$ represents a selected frequency within said given frequency range.

12. The apparatus as defined in claim 11 wherein the given frequency range is 4.3 to 6.3 MHz and wherein $f_o$ is selected to be 5.3 MHz.

* * * * *